United States Patent
Kappagantu et al.

(10) Patent No.: US 8,191,690 B2
(45) Date of Patent: Jun. 5, 2012

(54) SHIM STRUCTURE FOR BRAKE SQUEAL ATTENUATION

(75) Inventors: Ramana Kappagantu, Canton, MI (US); Eric Denys, Ann Arbor, MI (US)

(73) Assignee: Material Sciences Corporation, Elk Groove Village, IL (US)

( * ) Notice: Subject to any disclaimer, the term of this patent is extended or adjusted under 35 U.S.C. 154(b) by 832 days.

(21) Appl. No.: 12/103,148

(22) Filed: Apr. 15, 2008

(65) Prior Publication Data

US 2009/0255766 A1 Oct. 15, 2009

(51) Int. Cl.
*F16D 65/38* (2006.01)
(52) U.S. Cl. .............. 188/73.37; 188/250 E; 188/264 G
(58) Field of Classification Search ............... 188/73.37, 188/250 B, 250 E, 250 G, 250 R, 264 G
See application file for complete search history.

(56) References Cited

U.S. PATENT DOCUMENTS

| | | | |
|---|---|---|---|
| 4,603,760 A * | 8/1986 | Myers | 188/73.37 |
| 5,407,034 A | 4/1995 | Vydra et al. | |
| 5,509,508 A | 4/1996 | Evans | |
| 5,518,088 A * | 5/1996 | Brosilow | 188/73.37 |
| 5,538,104 A * | 7/1996 | Katz et al. | 188/73.1 |
| 6,170,620 B1 * | 1/2001 | Akita et al. | 188/251 A |
| 6,283,258 B1 * | 9/2001 | Chen et al. | 188/250 E |
| 6,349,803 B2 | 2/2002 | Brosilow | |
| 7,032,723 B2 | 4/2006 | Quaglia et al. | |
| 7,568,561 B2 * | 8/2009 | Bosco, Jr. | 188/250 B |
| 7,731,004 B2 * | 6/2010 | Roehling | 188/250 B |
| 2006/0096814 A1 * | 5/2006 | Hoffrichter et al. | 188/73.37 |
| 2009/0000893 A1 * | 1/2009 | Denys | 188/381 |

* cited by examiner

*Primary Examiner* — Robert A Siconolfi
*Assistant Examiner* — Mariano Sy
(74) *Attorney, Agent, or Firm* — Quinn Law Group, PLLC

(57) ABSTRACT

A shim structure is provided for damping vibration and attenuating noise in a brake system. The brake system includes a forcing member operable to urge a friction member against a rotating member to slow or stop the same. The shim structure includes a shim body that is adapted to be interposed within the brake system. The shim body includes one or more tabs that are configured to oscillate out-of-phase with vibrations generated by the brake system during urging of the friction member against the rotating member to thereby dissipate vibrational energy generated by the brake system. The dimensions, orientation, and/or location of each tab are selected or engineered to provide predetermined levels of vibration and noise attenuation. A mass may be attached to each tab. The geometry, location, and/or size of each mass may be selectively modified to provide predetermined levels of vibration and noise attenuation.

17 Claims, 3 Drawing Sheets

SHIM STRUCTURE FOR BRAKE SQUEAL ATTENUATION

TECHNICAL FIELD

The present invention relates generally to brake assemblies, and more specifically to shim structures used in vehicle brake systems for minimizing system vibration, damping brake noise, and improving heat distribution and dissipation.

BACKGROUND OF THE INVENTION

Most conventional motor vehicles are equipped with a brake system for selectively slowing or stopping movement of the vehicle in a controlled manner. Modern automotive braking systems may be grouped into two basic categories: disc brakes and drum brakes. A typical brake system may include a disc brake assembly for each of the front wheels and either a drum brake assembly or a disc brake assembly for each of the rear wheels. Regardless of type, brake assemblies are normally actuated by hydraulic, pneumatic, or mechanical pressure which is activated, for example, by an operator of the vehicle depressing a foot pedal, pulling a hand lever, or via other user interfaces.

The primary components of a conventional disc brake assembly are the brake rotor (a.k.a disc), and one or more pistons and brake pads (also known as brake linings) functionally mounted inside a caliper assembly. The brake pads have a frictional lining supported by a rigid backing plate. The rotor is typically mounted so as to rotate with the axle of the wheel to be braked, thereby configured to transmit braking forces from the caliper assembly to the wheel.

The caliper assembly, which houses the friction pads and pistons, is either solidly attached (fixed-type) or slidably mounted (floating-type) to a stationary, non-rotatable component of the vehicle, such as the vehicle frame. The piston(s), traditionally having a circular transverse cross-section, is slidably received in a cylinder bore of the caliper housing such that the centerline of the piston is parallel to the axis of rotation of the rotor. Through the application of pressure, whether it be hydraulic, mechanical, or pneumatic, the piston is forced into an adjacent brake pad and, in so doing, urge the friction lining against a surface of the disc rotor and thereby mechanically oppose and restrain rotational movement of the disc rotor through friction.

During a braking application, the brake pad and rotor may vibrate and generate a high-pitched brake noise, referred to in the art as "brake squeal". For example, when the friction material of the brake pad contacts the rotor or drum of a brake assembly unevenly, the coupling may cause the pad and rotor to oscillate and vibrate (known as "force-coupled excitation"). Additionally, as the brake assembly components heat up, the rotor may develop hot spots. The hot spots can cause the rotor to have regions of varying depth and friction, producing inconsistent levels of brake torque, and potentially exacerbating the aforementioned brake squeal. Brake squeal is generally unappealing and unpleasant to vehicle occupants, pedestrians, etc., especially as vehicles are designed to be more comfortable and quieter. Hence, vehicle noise, vibration, and harshness (NVH) is an important priority for today's original equipment manufacturers (OEM).

Efforts have been made to remedy or at least alleviate brake squeal. Some simple techniques like beveling or chamfering the linings, greasing the contact portion between the caliper and the linings, etc. help reduce squeal. Another approach to reducing or preventing brake squeal is to use a brake shim (also referred to in the art as "brake insulator"), which is inserted between the piston and backing plate of an adjacent brake pad, to reduce the magnitude of vibrations (resonance instability) of the brake pad and the disc rotor.

Brake shims control noise in three primary ways. First, they reduce or prevent the transmission and amplitude of vibrational forces that cause excitation of the caliper, pad assembly, and attached structure. This may be accomplished by integrating a viscoelastic damping material within the layered construction of the shims, or through the bonding of the shim to the pad assembly. Second, shims add mass, even if minimally, to the brake linings which, in turn, damps vibrations and oscillations by reducing reaction forces transmitted back into the brake piston using elastomer interface coatings on their surface. Finally, the brake shim can act as a thermal barrier to ensure consistent temperatures across the entire face of the pad, minimizing rotor hot spots and uneven lining wear, and providing a more uniform brake torque.

SUMMARY OF THE INVENTION

Provided herein are shim structures for damping vibration and attenuating noise in brake systems having a forcing member operable to urge a friction member against a rotating member to slow or stop the same. The shim structures described hereinbelow provide high temperature durability, improved heat dissipation, as well as superior sound damping characteristics. In addition, the shim structures presented herein also offer improved isolation during braking, and the ability to be adapted for different braking pressures and for implementation into various braking applications.

According to one embodiment of the present invention, the shim structure includes a shim body that is adapted to be interposed within the brake system (e.g., between the friction member and forcing member). The shim body has at least one tab that is configured to oscillate out-of-phase with vibrations generated by the brake system during urging of the friction member against the rotating member to thereby dissipate vibrational energy generated by the brake system. The dimensions, orientation, and/or positioning of each tab are designed or engineered to provide predetermined levels of vibration and noise attenuation.

In accordance with one aspect of this embodiment, each tab is defined by one or more grooves which extend through the shim body. Ideally, each tab extends substantially coplanar with the shim body. Alternatively, each of the tabs extends from an outer peripheral edge of the shim body. In this instance, the tab may be selectively oriented to meet packaging and design restrictions. For example, each tab may extend substantially coplanar with the shim body, can be oriented substantially flush against the shim body, or extend substantially orthogonally from the outer peripheral edge of the shim body.

According to another aspect, the shim structure also includes one or more masses attached to each of the tabs. The geometry, positioning, and/or size of each mass may be selectively modified or engineered to provide a predetermined level of vibration and noise attenuation. Each mass is either attached to an outer surface of a respective tab, distal from the friction member, or is attached to an inner surface of the tab, proximate to the friction member. In regard to the latter, each mass is preferably disposed inside of a complementary hole formed in the friction member (i.e., backing plate of a brake pad). An outer peripheral surface of each mass may be configured to frictionally engage an inner peripheral surface of a respective hole to increase energy dissipation. In a similar respect, the outer peripheral surface of the mass may include a coating thereon that is configured to frictionally engage the mass with the inner peripheral surface of the complementary hole.

According to yet another aspect of this embodiment, the shim structure includes a layer of viscoelastic material that extends between, and is bonded to the shim body and the friction member thereby increasing the damping capacity of the shim structure.

In yet another aspect, the shim structure further includes a layer of adhesive that extends between the shim body and the friction member to bond the same. Contrastingly, the tabs are characterized by an absence of an adhesive layer thereon.

In accordance with still another aspect, the shim body and tabs consist essentially of a substantially flat, single-piece plate member formed from a high temperature tempered metallic material.

According to another embodiment of the present invention, a shim structure for damping vibration and attenuating noise in a motor vehicle disc brake assembly is provided. The disc brake assembly has a brake pad with a backing plate supporting a friction lining thereon. A piston member is operable to urge the brake pad against a brake rotor to thereby slow or stop the vehicle. The shim structure includes a shim body that is adapted to be interposed between the backing plate and the piston member. The shim body has at least one tab that is configured to counterbalance resonance instability generated by the brake system during urging of the brake pad against the brake rotor to thereby dissipate vibrational energy generated by the brake system. Each of the tabs is selectively positioned along the shim body to be immediately adjacent a predefined location of the brake pad having a predetermined vibrational amplitude (e.g., the highest relative amplitude) or frequency (e.g., resonance frequency).

Also provided herein is a disc brake assembly for a motorized vehicle. The brake assembly includes a rotor operatively mounted with respect to one of the vehicle wheels to transmit braking forces thereto. A housing member is operatively mounted to the vehicle proximate to the brake rotor. One or more brake pads is operatively disposed within the housing member, and configured to frictionally engage the brake rotor. A piston member is movably disposed within the housing member, and operable to selectively effect the frictional engagement between the brake pads and the rotor. A shim member is interposed between one of the brake pads and the piston member. The shim member has at least one tab that is configured to oscillate out-of-phase with vibrations generated by the brake system during urging of the brake pad against the rotor to thereby dissipate vibrational energy generated by the brake system.

The above features and advantages, and other features and advantages of the present invention will be readily apparent from the following detailed description of the preferred embodiment and best modes for carrying out the present invention when taken in connection with the accompanying drawings and appended claims.

DETAILED DESCRIPTION OF THE PREFERRED EMBODIMENTS

Figure 1:
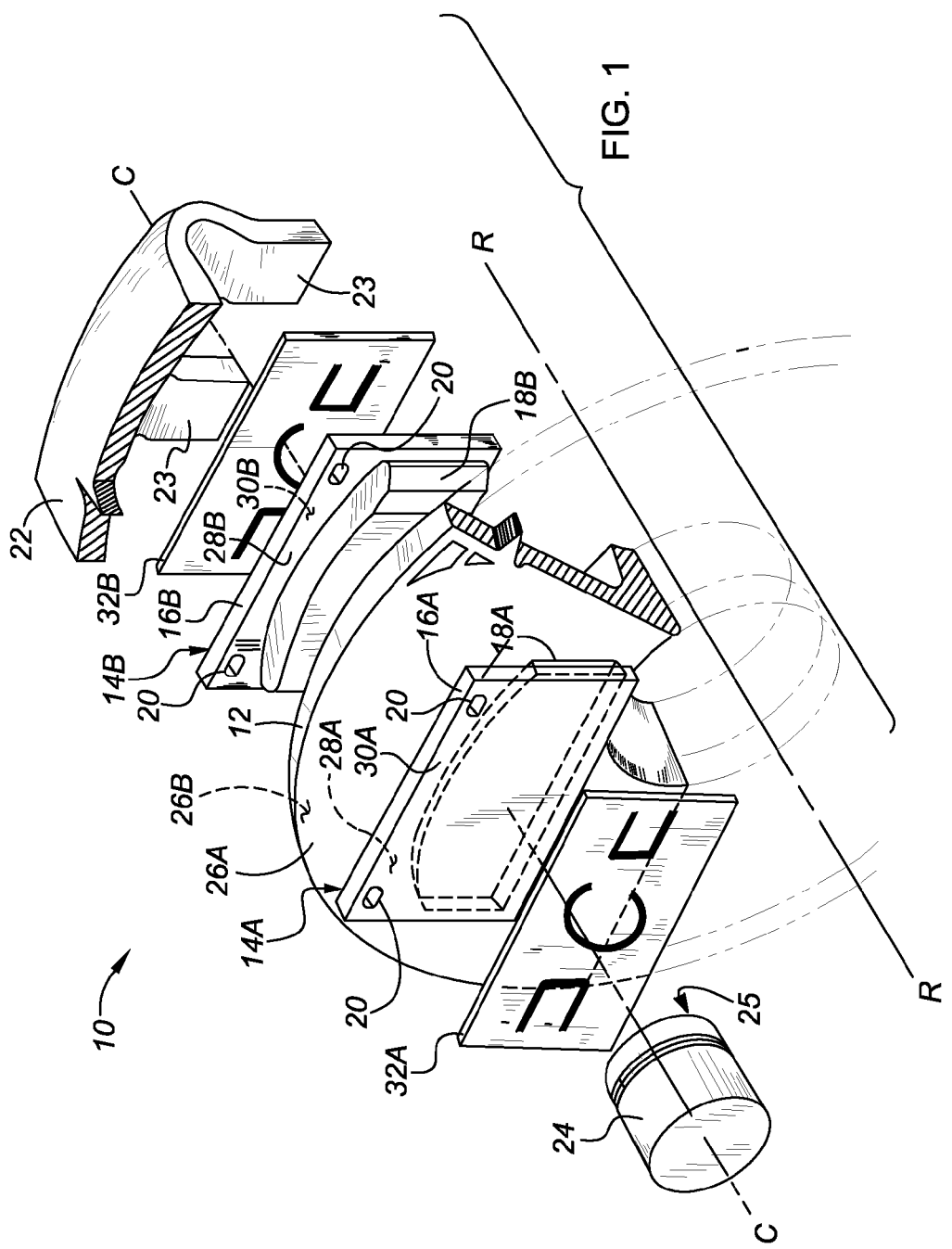
FIG. 1 is an exploded perspective-view illustration of an exemplary vehicle disc brake assembly for use of the sound damping brake shims of the present invention.

Referring to the drawings, wherein like reference numbers refer to the same or similar components throughout the several views, FIG. 1 is an exploded perspective-view illustration of a representative disc brake assembly, identified generally as 10, for use of the various brake shims in accordance with the present invention. The disc brake assembly 10 is illustrated in FIG. 1 as single-piston, floating-type disc brake assembly. The present invention, however, may be integrated into other brake system assemblies, such as multiple-piston brake assemblies and fixed-type disc brake assemblies, without departing from the inventive concept presented herein. In addition, the application of FIG. 1 is provided merely for explanatory purposes—the constituent members are purely exemplary and the dimensions thereof exaggerated for clarity and for a better understanding of the present invention. As such, the present invention is by no means limited to the structure illustrated in FIG. 1.

The disc brake assembly 10 of FIG. 1 includes one or more friction members, defined herein by first and second brake pads 14A and 14B, respectively, each disposed on a respective side of a rotating member, such as disk brake or rotor 12. The rotor 12 is rotatably mounted with the axle of a vehicle wheel (not shown), and configured to transmit braking forces from the disc brake assembly 10 to the wheel. Each brake pad 14A, 14B includes a respective backing plate 16A and 16B of sufficient rigidity to support a friction lining 18A and 18B, respectively, thereon. The friction linings 18A, 18B are correspondingly mounted to the face 28A, 28B of the backing plate 16A, 16B that is proximate to the rotor 12. The friction lining 18A, 18B is the element of the brake pad 14A, 14B that contacts the rotor 12 to provide the frictional force necessary to slow or stop the vehicle (not specifically identified in the drawings), as will be discussed in detail below. The first and second brake pads 14A, 14B are slidably supported, e.g., via pins or rods (not shown), which extend through identical openings 20 in the upper left- and right-extents of each backing plate 16A, 16B and affix to a caliper housing, shown partially broken away in FIG. 1 at 22.

In operation, the first and second brake pads 14A, 14B are collaboratively urged towards one another by piston 24 and housing fingers 23, respectively, coaxially translating along a centerline C. The piston 24 is slidably received in a cylinder bore (not shown) of the caliper housing 22, and oriented such that the centerline C of the piston 24 and brake pads 14A, 14B is parallel to the axis of rotation R of the rotor 12. The piston 24 can be actuated by mechanical, hydraulic, or pneumatic pressure, or by electro-mechanical force (e.g., in an electronic or "by-wire" braking system). The force of the piston 24 presses the linings 18A, 18B of each brake pad 14A, 14B into frictional engagement with respective contact surfaces or friction surfaces 26A and 26B of the rotor 12. In other words, the transverse load of the piston 24 is transmitted as mechanical friction to the rotor surfaces 26A, 26B via the first and second brake pads 14A, 14B, thereby opposing rotation of the rotor 12. The brake rotor 12, in turn, transmits the braking force from the disc brake assembly 10 to the vehicle wheel in order to selectively slow or stop the vehicle in a controlled manner.

Also included in the disc brake assembly 10 is one or more brake insulators, defined herein by first and second sound damping brake shims 32A and 32B, respectively. The first brake shim 32A is interposed between the first brake pad 14A and the piston 24, whereas the second brake shim 32B is interposed between the second brake pad 14B and the caliper housing 22. As seen in FIG. 1, the first brake shim 32A is disposed between, and operatively aligned with an apply face 25 of the piston 24 and the face 30A of the first backing plate 16A distal from the rotor 12. In a similar regard, the second brake shim 32B is disposed between, and operatively aligned with the housing fingers 23 of the caliper housing 22 and the face 30B of the backing plate 16B distal from the rotor 12.

As described more clearly below, the first and second brake shims 32A, 32B are provided, in part, to reduce and/or eliminate undesired vibration and brake squeal noise during a braking application (i.e., actuation of the piston 24 to frictionally engage the first and second brake pads 14A, 14B with the rotor 12), and provide for improved isolation and thermal dissipation. Although not shown herein, the first and second shims 32A, 32B can include one or more sets of claws or grips configured to interface with and more firmly fasten the brake shims 32A, 32B to their respective counterparts—e.g., the first and second backing plates 16A, 16B.

Figure 2A:
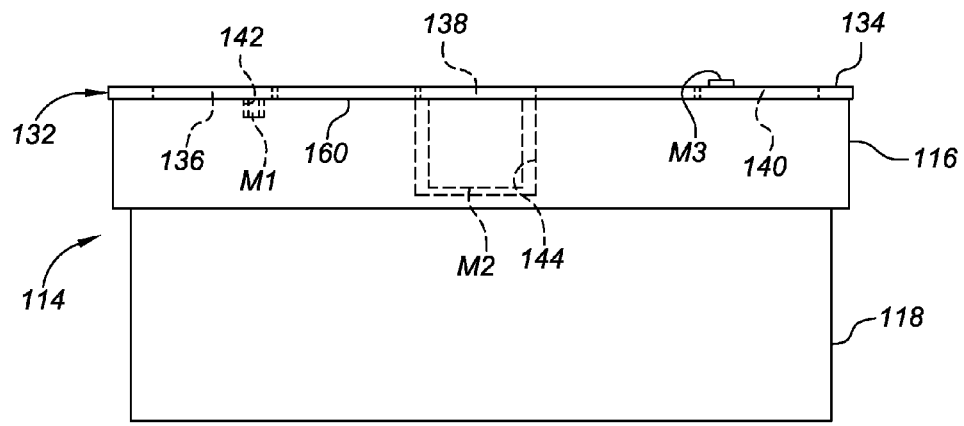
FIG. 2A is a side-view schematic illustration of a sound damping brake shim and brake pad in accordance with one embodiment of the present invention.

Looking now to FIG. 2A, a schematic illustration of a sound damping brake shim 132 (also referred to herein as "shim structure") is presented in accordance with one embodiment of the present invention. FIG. 2A also illustrates a brake pad assembly 114 including a backing plate 116 and a friction lining 118 of known construction fixed to one side of the backing plate 116, as by a suitable bonding agent. Fixed to the opposite side of the backing plate 116 is the shim structure 132, which, in accordance with the embodiment of FIGS. 2A and 2B, comprises a substantially flat shim body 134. Ideally, the shim structure 132 is a single-piece, preformed plate member fabricated from a high temperature tempered metallic material known to have a suitable strength and structural resiliency for the intended application of the brake system 10, such as, but not limited to, cold rolled steel, hot dipped galvanized steel, stainless steel, aluminum, and the like, and may be finished with an anti-corrosive, highly durable coating (i.e., dichromate paint, zinc plating, etc., not shown). Although illustrated as a generally rectangular member, it is within the scope of the present invention that the shim structure 132 takes on additional shapes (e.g., a polygon, elliptical, and other geometric configurations), include beveled edges or corners, and have varying cross sections.

The shim body 134 includes at least one tab or flap that is configured to counterbalance resonance instability generated by a brake system (disc brake assembly 10 of FIG. 1) during a braking operation—i.e., when pressing the brake pad 114 against a brake rotor or similar element, to thereby dissipate vibrational energy generated by the brake system. According to the embodiment of FIG. 2A, first, second, and third quiet tabs 136, 138 and 140, respectively, oscillate out-of-phase with vibrations generated by the brake system during a braking operation, attenuating resultant kinetic energy. Each tab 136, 138 and 140 is formed through the shim body 134 (e.g., via stamping, casting, milling, or cutting), and preferably extends substantially coplanar therewith. As noted above, the shim structure 132 includes a layer of adhesive 160 that extends between the shim body 134 and the backing plate 116 of brake pad 114 to bond the two structures together. However, to ensure that the tabs 136, 138, 140 can operate properly, the tabs 136, 138, 140 are characterized by an absence of an adhesive layer thereon.

According to preferred practice, the dimensions, orientation, and positioning of each tab 136, 138, 140 are selectively modified to provide predetermined levels of vibration and noise attenuation. For example, each tab 136, 138, 140 is selectively positioned along the shim body 134 to be immediately adjacent a predefined location of the brake pad 114 having a predetermined vibrational amplitude—e.g., the location resonating the highest relative amplitude of vibration. As another example, the number of tabs may be increased or decreased to affect a proportional increase or decrease in the damping capacity of the shim structure 132. In a final example, the lengths of the first and third tabs 136, 140, identified in FIG. 2B as L1 and L3, respectively, and the diameter D2 of the second tab 138 may be individually or collectively designed to meet a particular frequency (e.g., a system resonance frequency).

One or more masses can be attached to the free-end of each tab 136, 138, 140 to further manipulate the damping characteristics of the shim structure 132. As seen in FIG. 2A, a first mass M1 (shown hidden in FIGS. 2A and 2B) is attached to an inner surface of the first tab 136, proximate to the brake pad 114. Similarly, a second mass M2 (also hidden in FIGS. 2A and 2B) is attached to an inner surface of the second tab 138, proximate to the brake pad 114. The first and second masses M1, M2 are respectively positioned or disposed inside a complementary hole 142 and 144 formed in the backing plate 116 of the brake pad 114 by, for example, drilling or stamping. A third mass M3 is attached to an outer surface of the third tab 140, distal from the brake pad 1 14. It should be recognized that each tab may include more than one mass, individually or collectively attached to either opposing side thereof, without departing from the intended scope of the present invention.

The geometry, positioning, and size of each mass M1-M3 may be selectively modified to provide a predetermined level of vibration and noise attenuation. By way of example, the positioning of each mass M1-M3 along its respective tab 136, 138, 140 can be changed to increase or decrease the moment of force generated thereby. In a similar respect, increasing the size of mass M1, for example, will change the tuning frequency.

Figure 2B:
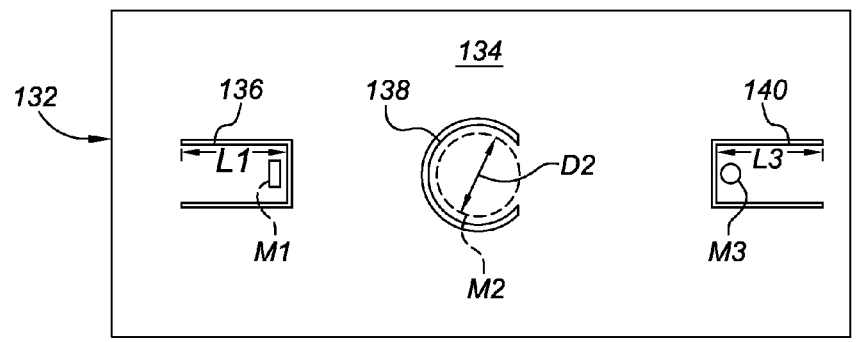
FIG. 2B is a top-view schematic illustration of the brake shim of FIG. 2A.

FIGS. 3 through 6 illustrate separate embodiments of the present invention that function similarly to the previously described shim structure 132 of FIGS. 2A and 2B. For simplicity and brevity, like reference numbers are used in FIGS. 3 through 6 to refer to like components from FIGS. 2A-2B. Correspondingly, unless specified otherwise, the components of FIGS. 3-6 should be considered identical to a respective component of FIGS. 2A-2B identified with a similar or identical reference number. Furthermore, the embodiments depicted in FIGS. 3-6, like FIGS. 2A-2B, are not to scale and are provided purely for clarification purposes. Thus, the particular dimensions of the drawings presented herein are not to be considered limiting.

Figure 3:
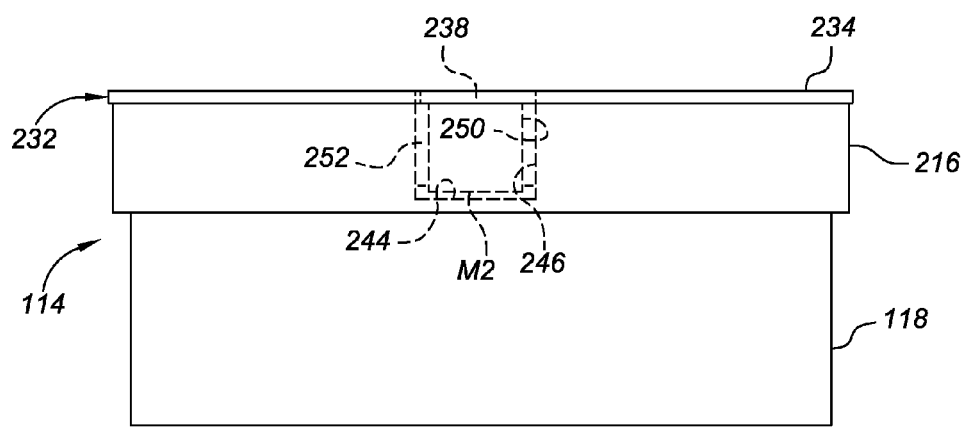
FIG. 3 is a side-view schematic illustration of a sound damping brake shim and brake pad in accordance with another embodiment of the present invention.

FIG. 3 schematically illustrates a sound damping brake shim (or "shim structure") 232 in accordance with another embodiment of the present invention. Similar to the embodiment of FIGS. 2A and 2B, the shim structure 232 of FIG. 3 includes a shim body 234 that is adapted to be interposed between a brake pad 114 and a forcing member (e.g., piston 24 of FIG. 1) of a brake system. The shim structure 232 defines a tab 238, which extends through the shim body 234. The tab 238 is configured, similar to the tabs of FIGS. 2A and 2B, to counterbalance resonance instability generated by a brake system (e.g., disc brake assembly 10 of FIG. 1) during a braking operation—i.e., when pressing the brake pad 114 against a brake rotor or similar element, to thereby dissipate vibrational energy generated by the brake system. A mass M2 (shown hidden in FIG. 3) is attached to an inner surface of the tab 238, proximate to the brake pad 114. The mass M2 is disposed inside a complementary hole 244 formed in the backing plate 216 of the brake pad 114.

Figure 4:
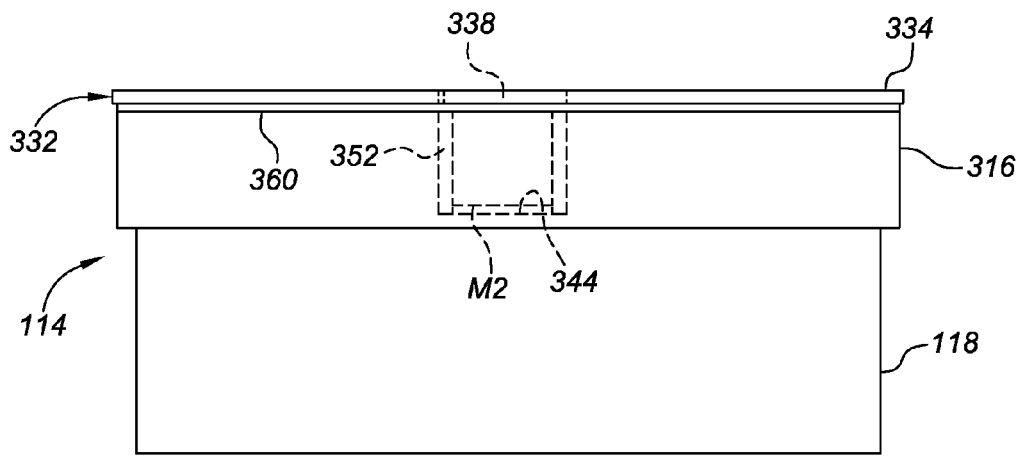
FIG. 4 is a side-view schematic illustration of a sound damping brake shim and brake pad in accordance with yet another embodiment of the present invention.

In the embodiment of FIG. 3, an outer peripheral surface 250 of mass M2 is configured to frictionally engage an inner peripheral surface 246 of the complementary hole 244 to increase energy dissipation. Specifically, the outer peripheral surface 250 of mass M2 includes a coating 252 thereon that is thick enough to frictionally engage the mass M2 with the inner peripheral surface 246 of the hole 244. Increasing friction between the walls of the hole 244 and the mass M2 affects the boundary conditions therebetween and, hence, changes the frequency of oscillation of the tab 238. As an alternative, the coating 252 may be added to the inner peripheral surface 246 of the hole 244, as seen in FIG. 4. Finally, the frictional engagement between the mass M2 and hole 244 may be effected by alternate means, such as, but not limited to, widening the mass M2, narrowing the hole 244, or including one or more flanges or protuberances on either part that extends so as to contact the other part.

FIG. 4 schematically illustrates a sound damping brake shim (or "shim structure") 332 in accordance with another embodiment of the present invention. Similar to the embodiments discussed above, the shim structure 332 of FIG. 4 includes a shim body 334 that is adapted to be interposed between a brake pad 114 and a forcing member (e.g., piston 24 of FIG. 1) of a brake system. The shim structure 332 defines a tab 338, which extends through the shim body 334. The tab 338 is configured, similar to the tabs of FIGS. 2A-3, to counterbalance resonance instability generated by a brake system (e.g., disc brake assembly 10 of FIG. 1) during a braking operation—i.e., when pressing the brake pad 114 against a brake rotor or similar element, to thereby dissipate vibrational energy generated by the brake system. A mass M2 (shown hidden in FIG. 4) is attached to an inner surface of the tab 338, proximate to the brake pad 114. The mass M2 is disposed inside a complementary hole 344 formed in the backing plate 316 of the brake pad 114.

The shim structure 332 of FIG. 4 includes a layer of viscoelastic material 360 that extends between, and is bonded to the shim body 334 and the backing plate 316 of the brake pad 114. The layer of viscoelastic material 360 increases the damping characteristics of the shim structure 332. That is, sandwiching the layer of viscoelastic material 360 between the shim body 334 and backing plate 316 provides additional noise and vibration reduction because deformation forces exacted along the outer surface of the shim structure 232 will be transferred to the layer of viscoelastic material 360. These forces shear across the layer of viscoelastic material 360, which is constrained by the shim body 334 and backing plate 316, which dissipates the energy into heat, thereby damping vibrations and resultant noise. A number of known viscoelastic materials could be used, including, but certainly not limited to, acrylic or silicon polymers, fluoropolymers, nitrile rubber and the like. Notably, the shim structure 332 may include additional constraining layers and additional viscoelastic layers without departing from the intended scope of the present invention. Similar to the layer of adhesive 142 identified in FIG. 2A, the tab 338 of FIG. 4 is characterized by an absence of viscoelastic material thereon to ensure that the tab 338 can oscillate.

Figure 5:
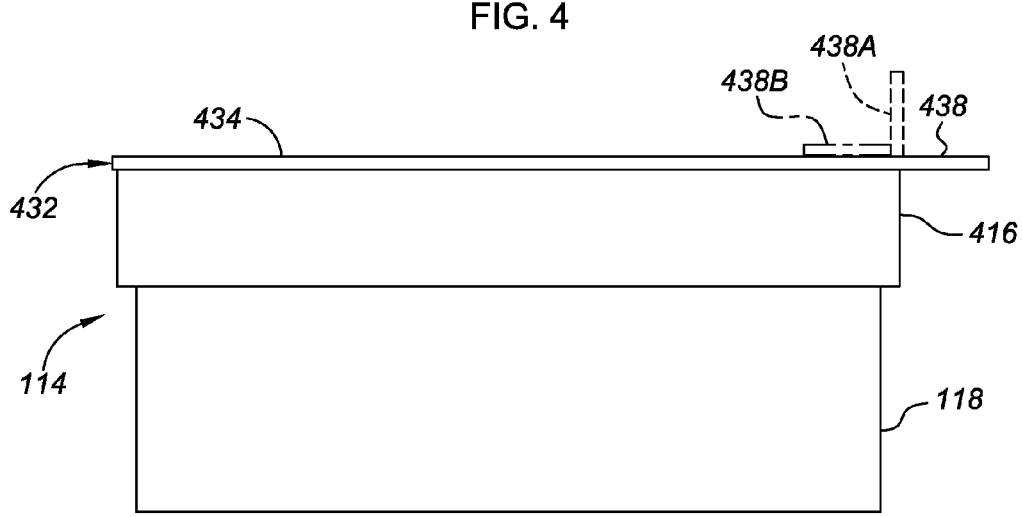
FIG. 5 is a side-view schematic illustration of a sound damping brake shim and brake pad in accordance with still another embodiment of the present invention.
Figure 6:
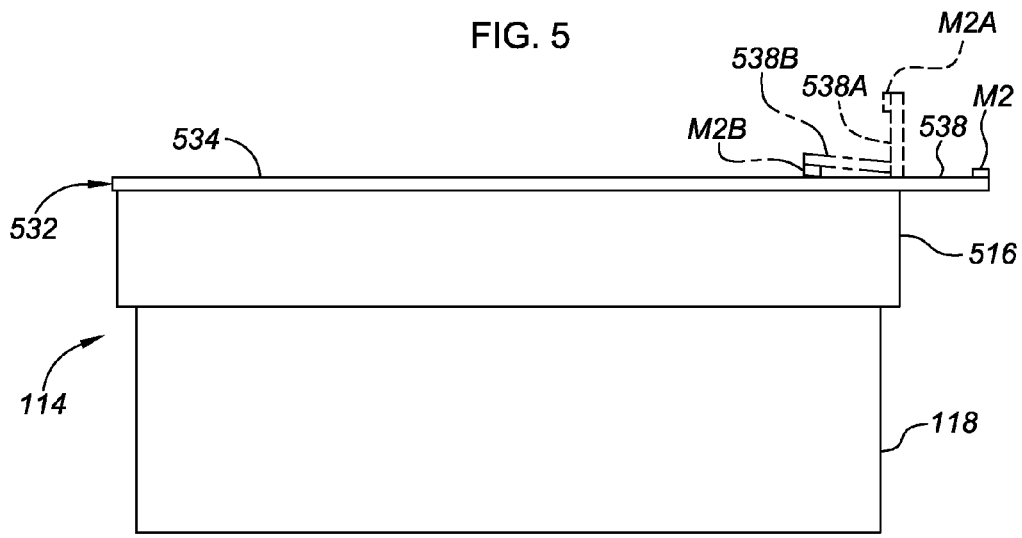
FIG. 6 is a side-view schematic illustration of a sound damping brake shim and brake pad in accordance with even another embodiment of the present invention.

Two additional embodiments of the present invention are depicted respectively in FIGS. 5 and 6 of the drawings—one sound damping brake shim (or "shim structure") is presented in FIG. 5 at 432, and a second in FIG. 6 at 532. Similar to the embodiments discussed hereinabove, the shim structures 432 and 532 each include a shim body 434 and 534, respectively, that is adapted to be interposed between the brake pad 114 and a forcing member (e.g., piston 24 of FIG. 1) of a brake system.

In contrast to the embodiments presented above, the shim structure 432 of FIG. 5 includes one or more tabs or extensions 438 that protrude or extend from an outer peripheral edge of the shim body 434. For example, the tab 438 can extend directly out from the shim body 434, beyond the backing plate 416, in a substantially coplanar manner. As an alternative, the tab may extend substantially orthogonally from the outer peripheral edge of the shim body 434 (which is illustrated as hidden tab 438A in FIG. 5), or be oriented substantially flush against the shim body (which is illustrated as hidden tab 438B in FIG. 5). The tab 438 is configured, similar to the tabs of FIGS. 2A-4, to counterbalance resonance instability generated by a brake system (e.g., disc brake assembly 10 of FIG. 1) during a braking operation—i.e., when pressing the brake pad 114 against a brake rotor or similar element, to thereby dissipate vibrational energy generated by the brake system. The sole distinction between the embodiment of FIG. 5 and the alternate embodiment illustrated in FIG. 6 is that a mass M2 is attached to an inner surface of the tab 538. The mass M2 may be added as a separate constituent part, or may be a portion of the tab 538 folded back on itself.

While the best modes for carrying out the present invention have been described in detail, those familiar with the art to which this invention relates will recognize various alternative designs and embodiments for practicing the invention within the scope of the appended claims.

The invention claimed is:

1. A shim structure for use in a brake system having a forcing member operable to urge a friction member against a rotating member to slow or stop the rotating member, the shim structure comprising:
    a shim body adapted to be interposed within the brake system, said shim body having at least one tab that is configured to oscillate out-of-phase with vibrations generated by the brake system during urging of the friction member against the rotating member to thereby dissipate vibrational energy generated by the brake system;
    wherein said at least one tab is defined within said shim body by at least one groove extending through the shim body, said at least one tab extending substantially coplanar with said shim body;
    at least one mass at least partially surrounded by said at least one groove, wherein said at least one mass is not substantially co-planar with said at least one tab; and
    a layer of adhesive extending between said shim body and a backing plate of the friction member to bond said shim body to the backing plate of the friction member, wherein said at least one tab is characterized by an absence of an adhesive layer thereon.

2. The shim structure of claim 1, wherein at least one of the dimensions, orientation, and positioning of said at least one tab is engineered to provide a predetermined level of vibration and noise attenuation.

3. The shim structure of claim 1, wherein said at least one tab extends from an outer peripheral edge of said shim body.

4. The shim structure of claim 3, wherein said at least one tab extends substantially coplanar with said shim body.

5. The shim structure of claim 3, wherein said at least one tab extends substantially orthogonally from said outer peripheral edge of said shim body.

6. The shim structure of claim 3, wherein said at least one tab is oriented substantially flush against said shim body.

7. The shim structure of claim 1, wherein at least one of the geometry, positioning, and size of said at least one mass is engineered to provide a predetermined level of vibration and noise attenuation.

8. The shim structure of claim 1, wherein said at least one mass is attached to an outer surface of said at least one tab that is distal from the friction member.

9. The shim structure of claim 1, wherein said at least one mass is attached to an inner surface of said at least one tab that is proximate to the friction member.

10. The shim structure of claim 9, wherein said at least one mass is disposed substantially inside a complementary hole formed in a backing plate of the friction member.

11. The shim structure of claim 10, wherein an outer peripheral surface of said at least one mass is configured to frictionally engage an inner peripheral surface of said complementary hole.

12. The shim structure of claim 10, wherein an outer peripheral surface of said at least one mass includes a coating thereon configured to frictionally engage said at least one mass with an inner peripheral surface of said complementary hole.

13. The shim structure of claim 1, further comprising:
a layer of viscoelastic material extending between and bonded to said shim body and a backing plate of the friction member.

14. The shim structure of claim 1, wherein said shim body and said at least one tab consist essentially of a substantially flat single-piece plate member formed from a high temperature tempered metallic material.

15. The shim structure of claim 1, wherein said at least one groove is substantially C-shaped.

16. A shim structure for damping vibration and attenuating noise in a motor vehicle disc brake assembly having a brake pad with a backing plate supporting a friction lining thereon, and a piston member operable to urge the brake pad against a brake rotor to thereby slow or stop the vehicle, the shim structure comprising:
a shim body adapted to be interposed between the backing plate and the piston member, said shim body having at least one tab that is configured to counterbalance resonance instability generated by the disc brake assembly during urging of the brake pad against the brake rotor to thereby dissipate vibrational energy generated by the brake system;
wherein said at least one tab is selectively positioned relative to said shim body to be immediately adjacent a predefined location of the brake pad having a predetermined vibrational amplitude or frequency;
wherein said at least one tab is defined within said shim body by at least one groove extending through the shim body, said at least one tab extending substantially coplanar with said shim body;
at least one mass at least partially surrounded by said at least one groove, wherein said at least one mass is not substantially co-planar with said at least one tab; and
a layer of adhesive extending between said shim body and a backing plate of the friction member to bond said shim body to the backing plate of the friction member, wherein said at least one tab is characterized by an absence of an adhesive layer thereon.

17. A disc brake assembly for a motorized vehicle having at least one wheel, the brake assembly comprising:
a rotor operatively mounted with respect to the at least one wheel to transmit braking forces thereto;
a housing member operatively mounted to the vehicle proximate to said brake rotor;
at least one brake pad operatively disposed within said housing member and configured to frictionally engage said brake rotor;
a piston member movably disposed within said housing member and operable to selectively effect the frictional engagement between said at least one brake pad and said rotor; and
a shim member interposed between said at least one brake pad and said piston member, said shim member having at least one tab that is configured to oscillate out-of-phase with vibrations generated by the disc brake assembly during urging of the brake pad against the rotor to thereby dissipate vibrational energy generated by the brake system;
wherein said at least one tab is defined within said shim body by at least one groove extending through the shim body, said at least one tab extending substantially coplanar with said shim body;
at least one mass at least partially surrounded by said at least one groove, wherein said at least one mass is not substantially co-planar with said at least one tab; and
a layer of adhesive extending between said shim body and a backing plate of the friction member to bond said shim body to the backing plate of the friction member, wherein said at least one tab is characterized by an absence of an adhesive layer thereon.

* * * * *